(No Model.)

J. P. NICKODEMUS.
FEED OR ROOT CUTTER AND CORN SHELLER.

No. 549,327.  Patented Nov. 5, 1895.

WITNESSES:  INVENTOR
  John P. Nickodemus
  BY
  ATTORNEY

United States Patent Office.

JOHN P. NICKODEMUS, OF SAGINAW, MICHIGAN.

FEED OR ROOT CUTTER AND CORN-SHELLER.

SPECIFICATION forming part of Letters Patent No. 549,327, dated November 5, 1895.

Application filed November 26, 1894. Renewed October 4, 1895. Serial No. 564,679. (No model.)

*To all whom it may concern:*

Be it known that I, JOHN P. NICKODEMUS, a citizen of the United States, residing at Saginaw, in the county of Saginaw and State of Michigan, have invented certain new and useful Improvements in Feed or Root Cutters and Corn-Shellers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention is a combined feed-cutter and corn-sheller; and it consists in the particular arrangement and combination shown and described.

Figure 1:
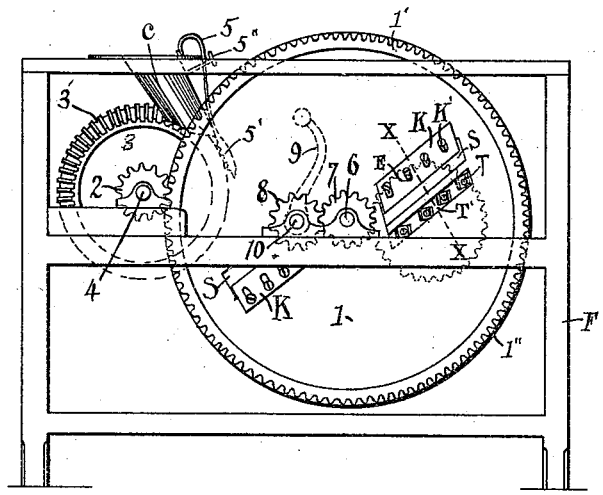
Figure 2:
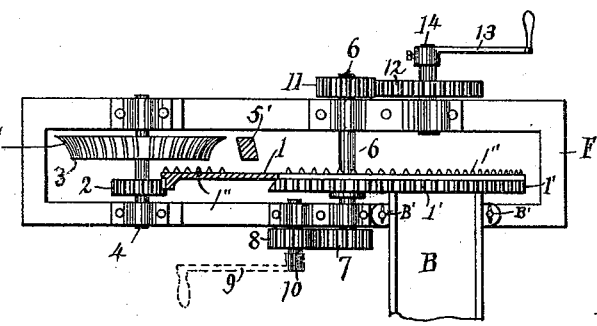
Figure 3:
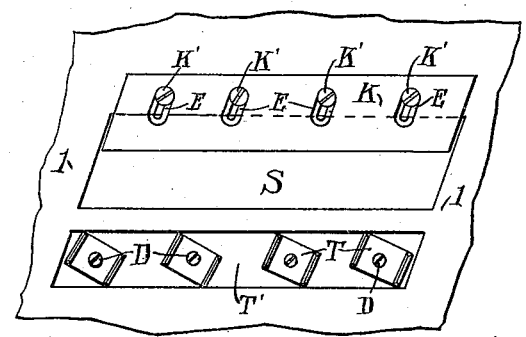
Figure 4:
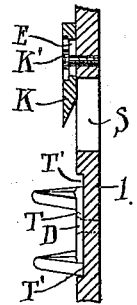

In the drawings, Figure 1 is a side elevation of the machine with part of the frame removed. Fig. 2 is a plan view. Fig. 3 is a detail of one of the knives of the feed-cutter, and Fig. 4 is an end view of the same.

F is the frame.

B is the box or hopper for the roots or feed to be cut.

C is the hopper for the corn.

1 is a large wheel having upon its surface two knives K K and having upon its circumferential surface cogs 1' meshing into pinion 2 on shaft 4. The wheel 1 is carried on the shaft 6, journaled in the frame. The knives K cover about one-half of the radius of the wheel and are situated midway between the center and the circumference and adjacent to slots S and extending beyond the edge of the slots. The slots S are rectangular, but not radial, and are secured against the flat surface of the wheel by the screws K', which fit into the tranverse grooves E in the knife. These grooves are for the purpose of adjusting the knives. Between the outer end of the knife and the circumference of the wheel are formed a number of teeth 1'', as shown in Fig. 2. These teeth, as will be seen hereinafter, are used in the corn-sheller.

T are a number of cutting-points secured in a recess T' in the wheel 1, adjacent to the slots and opposite below the knife K. They are of sufficient length to cut into the root, being cut to a depth greater than the depth of the knife-cut K, and cut the surface of the root into strips, which are shaved off by the knife K. The feed passes through the slots S after being cut away by the knife K. These cutting-points T have bases of less width than that of recesses T' and are secured to the wheel by the set-screws D and may be removed therefrom when cutting hay or straw or feed of like character.

B, as previously stated, is the hopper in which the feed is placed to be cut and is secured to the frame by the thumb-screws B' engaging lugs on the side of the box, the box being thereby removable and also adjustable to and from the cutting-edge, according as the material being cut requires.

It is obvious that in cutting hay or material of like character the knives K should cut close to the edge of the box, while in cutting roots it is not so material, and when using the points T, which extend beyond the line of the cut, it would be impossible to have the edge of the box close to the cutting-edge of the knife.

It will be observed that the knives are arranged at such an angle that they form a draw-cut with the edge of the box as the wheel 1 is revolved. The wheel 1 is revolved for the purpose of cutting the feed by the crank 13 on the shaft 14, journaled in the frame, and carrying a large pinion 12, meshing into a smaller pinion 11 on the end of the shaft 6. On the opposite end of the shaft 6 is a pinion 7 of the same size, which meshes into pinion 8 on shaft 10, carrying the handle 9. Turning this handle 9 also revolves the wheel 1, but not with sufficient rapidity for use in cutting feed; but this handle is used, as will be seen, when the corn-sheller is operated.

As previously mentioned, 4 is a shaft journaled in the frame carrying a small pinion 2, meshing into cogs 1' on the circumference of the large wheel 1. This shaft also carries wheel 3, having its circumferential edge beveled toward the pinion 2, the bevel being somewhat concave and having across the bevel the corrugations 3'. The hopper C is placed over this wheel 3, which is so located on the shaft 4 as to be very near the teeth 1'' on the wheel 1.

The hopper C is of the usual shape of a hopper on a corn-shelling machine and directs the cob between the wheels 3 and 1, the cogs 3' on the teeth 1'' tearing the kernel therefrom. In order that the cob may be kept close to these wheels no matter what its size, I arrange the spring 5, secured to the top of the hopper C and extending downward and engaging the cob below the hopper, at which point the spring 5 has corrugations 5'. By the aid of the thumb-screws 5'', I am enabled to adjust the pressure of the spring upon the cob. It will thus be seen that I am enabled to use the wheel 1 for two purposes—viz., in a feed-cutter and a corn-sheller—and it may be used as such simultaneously, if desired, although, perhaps, the rapidity of the revolutions necessary to cut feed would make it undesirable to shell corn at the same time; but that would depend to a large extent upon the kind of feed being cut. When used as a corn-sheller with the crank 9, the hopper B may be removed by unscrewing the thumb-screws B'.

It is obvious that the corn-sheller could be operated by means of the crank 13 by using an intermediate pinion between the pinions 12 and 11 and doing away with the pinions 7 and 8 on the opposite side of the frame. This I claim the right to do.

Having thus described my invention, what I claim as new, and desire to secure by Letters Patent, is—

1. In a combined feed cutter and corn sheller, the combination with the removable box B, of the cutting wheel 1 on a shaft journaled in the frame carrying the box B, and means for revolving the shaft, of the knives K adjustably secured upon the surface of the wheel on the side next to the box B, the cutting edge being the width of the knives from the wheel, the cutting points T adjustably secured in a recess in the wheel below the knives, the slot S passing entirely through the wheel, the teeth 1'' upon the opposite side of the wheel and extending from the circumference of the wheel inward for the proper distance, cogs 1' upon the circumferential edge of the wheel meshing into pinion 2, pinion 2 on the shaft 4 and the beveled wheel 3 on shaft 4, the bevel of the wheel being concave and having transverse corrugations, the wheel 3 being located near the toothed surface of the wheel 1, a hopper C, and spring 5, substantially as described.

2. In a feed cutter, the combination with the frame, a feed box and slotted wheel having its slots not radial to the axis of revolution of the wheel, and having also recesses in its outer surface adjacent to said slots, of the knives K secured to the wheel with their cutting edges extending into said slots, and the cutting points T formed with bases of less width than the recesses and adjustably secured to the wheel in said recesses by set screws passing through said base, as and for the purpose set forth.

In testimony whereof I affix my signature in presence of two witnesses.

JOHN P. NICKODEMUS.

Witnesses:
A. H. SWARTHOUT,
FANNIE ROBBINS.